US011838292B2

(12) United States Patent
Cohen et al.

(10) Patent No.: US 11,838,292 B2
(45) Date of Patent: Dec. 5, 2023

(54) SECURING COMPUTER NETWORKS WITH VIRTUAL NETWORKS

(71) Applicant: MasterPeace Solutions Ltd., Columbia, MD (US)

(72) Inventors: Andrew Samuel Cohen, Fulton, MD (US); Daniel Curtis Weller, Millersville, MD (US); Thomas Wasyl Martz, Columbia, MD (US); Kevin Michael Yeich, Ellicott City, MD (US); Raemar Antwarn Horne, Glen Burnie, MD (US); Tyler James Bryant, Odenton, MD (US)

(73) Assignee: MASTERPEACE SOLUTIONS LTD., Columbia, MD (US)

(*) Notice: Subject to any disclaimer, the term of this patent is extended or adjusted under 35 U.S.C. 154(b) by 0 days.

(21) Appl. No.: 17/192,534

(22) Filed: Mar. 4, 2021

(65) Prior Publication Data
US 2022/0286454 A1    Sep. 8, 2022

(51) Int. Cl.
*G06F 21/43* (2013.01)
*H04L 12/22* (2006.01)
*H04L 9/40* (2022.01)
*G06F 21/70* (2013.01)

(52) U.S. Cl.
CPC ...... *H04L 63/0876* (2013.01); *H04L 63/0236* (2013.01); *H04L 63/0263* (2013.01); *H04L 63/20* (2013.01)

(58) Field of Classification Search
None
See application file for complete search history.

(56) References Cited

U.S. PATENT DOCUMENTS

| 10,484,297 | B1* | 11/2019 | McClenahan ....... G06F 11/2041 |
| 2013/0198808 | A1 | 8/2013 | Thomson et al. |
| 2014/0344459 | A1* | 11/2014 | Kludy ................. H04L 41/0893 709/226 |
| 2016/0205071 | A1* | 7/2016 | Cooper ............... H04L 63/0209 726/1 |
| 2016/0323245 | A1* | 11/2016 | Shieh ...................... H04L 63/20 |
| 2017/0208038 | A1 | 7/2017 | Hinaman et al. |

(Continued)

OTHER PUBLICATIONS

A Survey on Software-Defined Network and OpenFlow: From Concept to Implementation. Hu. IEEE. (Year: 2014).*

(Continued)

*Primary Examiner* — Venkat Perungavoor
(74) *Attorney, Agent, or Firm* — Womble Bond Dickinson (US) LLP

(57) ABSTRACT

In one embodiment, a method is provided. The method includes receive, by a networking device, a request from a first computing device, to connect to the networking device. The method also includes creating a first network. The first network is one of a set of networks of the networking device. The first computing device is one of a set of computing devices that are connected to the network device. Each network of the set of networks is initially isolated from other networks of the set of networks when the network is created. Each network of the set of networks comprises a respective computing device of the set of computing devices. The method further includes assigning the first computing device to the first network.

14 Claims, 7 Drawing Sheets

(56) References Cited

U.S. PATENT DOCUMENTS

| | | | |
|---|---|---|---|
| 2018/0316769 A1 | 11/2018 | Akers et al. | |
| 2020/0092103 A1 | 3/2020 | Zavertnik et al. | |
| 2020/0092138 A1* | 3/2020 | Tillotson | H04L 12/4633 |
| 2020/0252375 A1 | 8/2020 | Chen et al. | |
| 2022/0045985 A1* | 2/2022 | Bareket | H04L 45/04 |

OTHER PUBLICATIONS

Security issues in SCADA networks. Igure. Elsevier. (Year: 2006).*
Topology Discovery in Software Defined Networks: Threats, Taxonomy, and State-of-the-Art. Khan. IEEE. (Year: 2017).*
CN103902884. English Translation. (Year: 2014).*
PCT International Search Report for PCT/US2022/019034 filed Mar. 4, 2022, dated Jun. 13, 2022, 6 pages.
PCT Written Opinion Of The International Searching Authority for PCT/US2022/019034 filed Mar. 4, 2022, dated Jun. 13, 2022, 7 pages.
PCT International Preliminary Report on Patentability for PCT/US2022/019034 filed Mar. 4, 2022, dated Sep. 14, 2023, 9 pages.

* cited by examiner

SECURING COMPUTER NETWORKS WITH VIRTUAL NETWORKS

TECHNICAL FIELD

This disclosure generally relates to computer networks. In particular, this disclosure relates to securing computer networks with virtual networks.

BACKGROUND

As the number of computing devices increase, the amount of computing devices that are connected to each other via networks also increase. For example, as internet-of-things devices are deployed, these devices are often connected to a common network. The common network is often used by various other computing devices to communicate data. For example, a network may be connected to computers (e.g., laptop computers, table computers, etc.), smart home devices (e.g., smart thermostats, a security camera, etc.), media streaming devices, gaming consoles, mobile devices, etc.

BRIEF DESCRIPTION OF THE DRAWINGS

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

As discussed above, the amount of computing devices that are connected to each other via networks is continually increasing. For example, as internet-of-things devices are deployed, these devices are often connected to a common network. The common network is often used by various other computing devices to communicate data. For example, a home network may be connected to computers (e.g., laptop computers, table computers, etc.), smart home devices (e.g., smart thermostats, a security camera, etc.), media streaming devices, gaming consoles, mobile devices, etc. Most networks allow complete/open access to all of the devices that are on the network by default. For example, each device on a network is able to discover the other devices that are also on that network. Because most networks allow open access to other devices, securing the computing devices and/or the networks is more problematic. If one device is compromised by a virus, malware, etc., the comprised device may be able to access other devices and may be able to spread viruses, malware, etc. The compromised device may also be used to perform malicious functions such as denial of service attacks, gather personal/private data, etc.

The embodiments described herein may secure networks and/or computing devices using virtual networks. A network device (e.g., a switch, a router, etc.) may create a virtual network for each computing device that is connected to the network device. Each virtual network includes only one computing device. By default, the computing device is not allowed to access other computing devices and/or external devices unless granted permission by one or more rules. When compared to standard networks which allow more open access by default unless denied by one or more rules, this allows the computer networks and/or computing devices to be more secure and/or safe. For example, because computing devices are not allowed to communicate with other computing devices unless there is a rule that explicitly grants this access, it may be harder for a computing device to become comprised by another computing device. In addition, if a computing device does become comprised, it is harder for the compromised computing device to compromise other computing devices (e.g., hard to spread viruses and/or malware).

Figure 1:
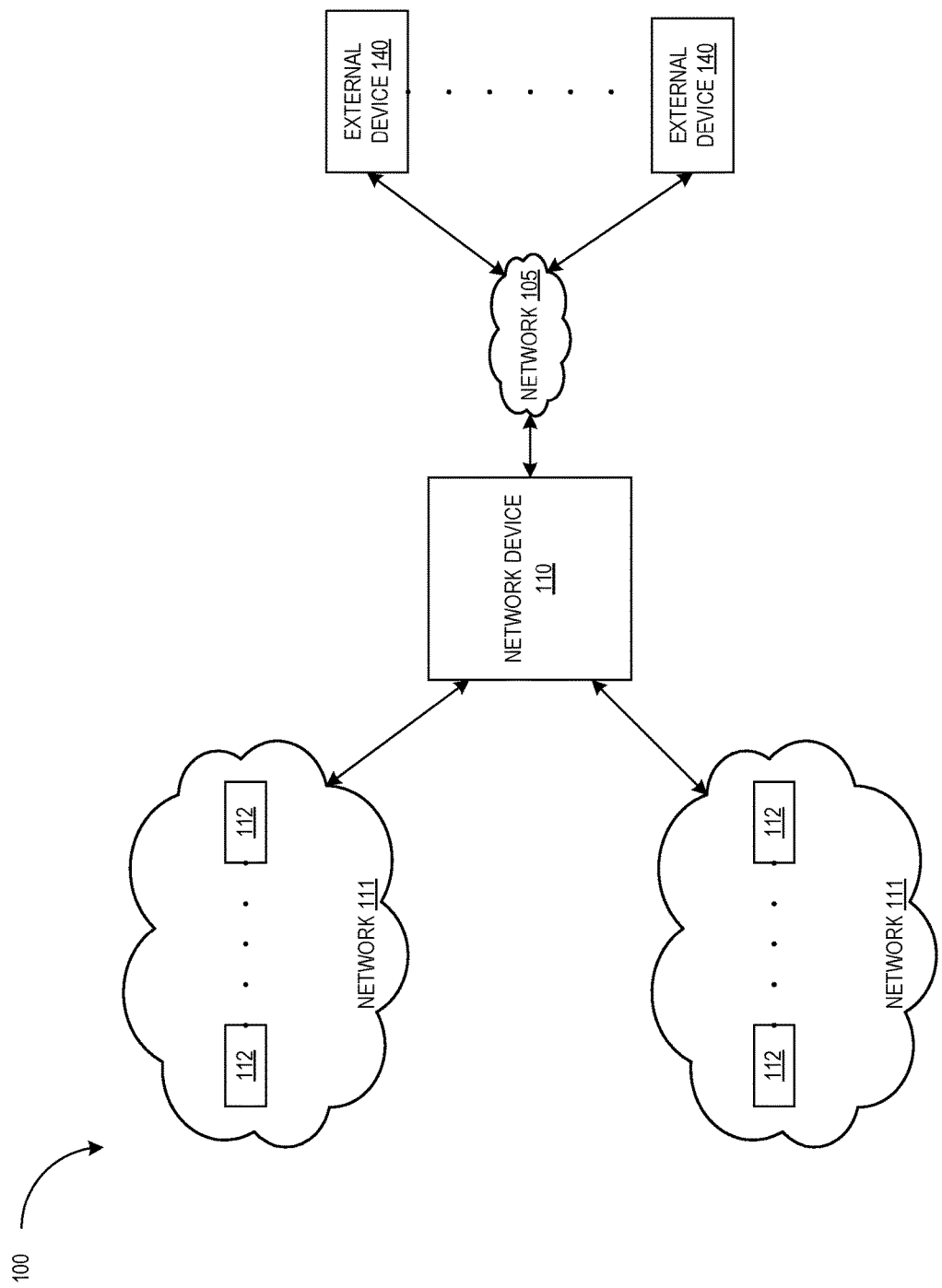
FIG. 1 is a block diagram illustrating an example network architecture in accordance with one or more embodiments of the disclosure.

FIG. 1 is a diagram illustrating an example network architecture 100, in accordance with one or more embodiments of the disclosure. The network architecture 100 includes network device 110, networks 111, computing devices 112, network 105, and external devices 140. The network device 110 may be a device (e.g., a switch, a router, etc.) that may forward data (e.g., messages, packets, frames, etc.) between the external devices 140 (via network 105) and the networks 111. The network device 110 may also forward data between the networks 111 and/or between the computing devices 112. The computing devices 112 may be may be any device, machine, or apparatus that is capable of executing a set of instructions (sequential or otherwise) that specify actions to be taken by that machine. For example, the computing devices 112 may be IOT devices, computers, smart home devices, smartphones, etc.

As discussed above, the networks 111 may be more open networks. For example, once a computing device 112 is connected to the network 111, the computing device 112 may be able to communicate with all other computing devices 112 on the network 111 by default. In addition, the computing device may also be able to communicate with other computing device 112 on other networks 111 by default. Furthermore, the computing devices 112 may be able to access external devices 140, such as server computers and/or other devices by default.

This openness may create security problem and/or may make it more difficult to secure the networks 111 and the computing devices 112. For example, if a computing device 112 is infected by malware, the malware may be able to transmit a user's personal data to an external device 140 (e.g., a server owned by a hacker) because access is generally granted by a more open network. In addition, the infected/compromised computing device may be able to infect other computing devices 112 because of the open nature of the networks 111. Thus, it may be useful to provide a more secure network and/or to secure the computing devices 112 from possible security attacks.

Figure 2:
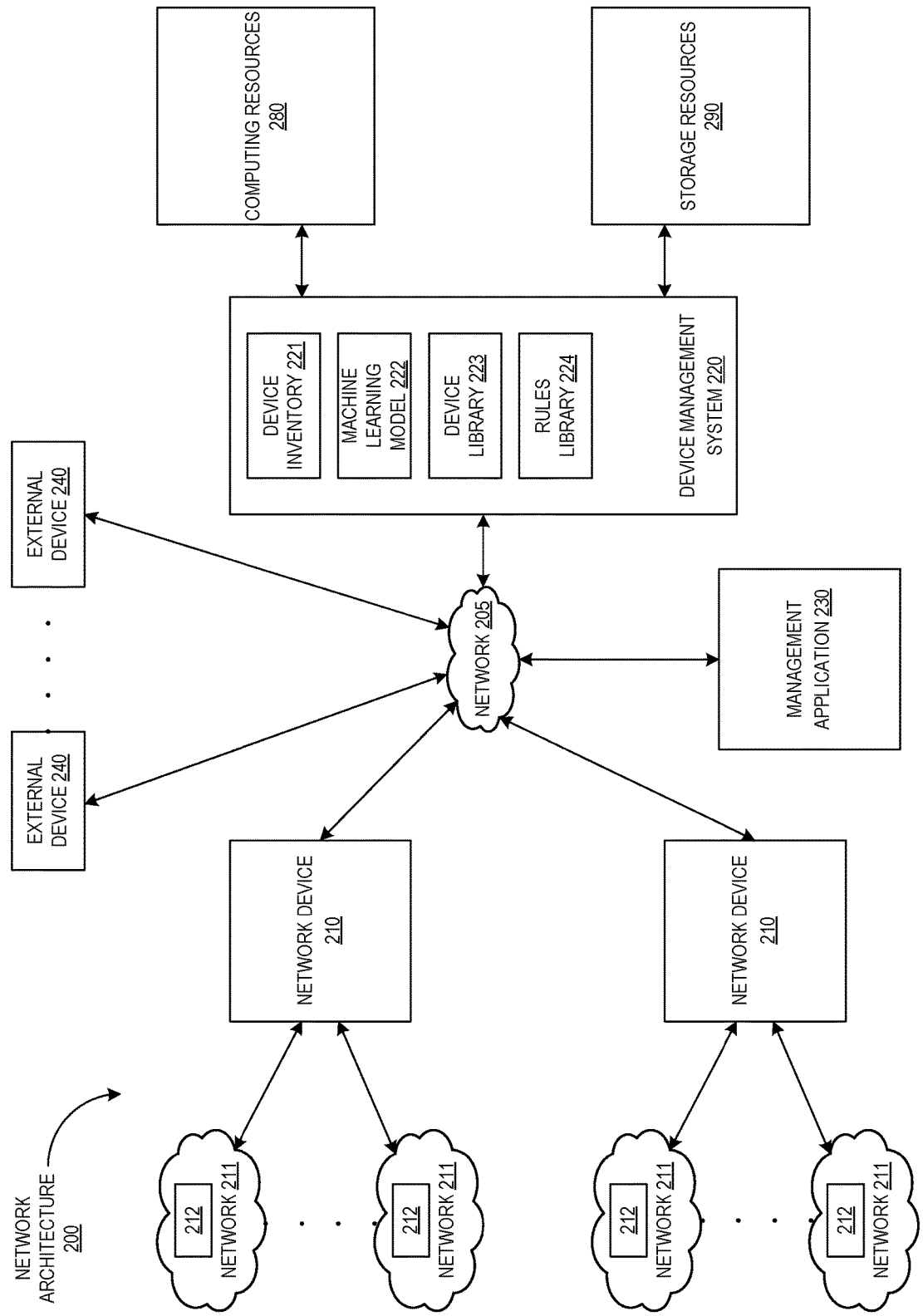
FIG. 2 is a block diagram illustrating an example network architecture in accordance with one or more embodiments of the disclosure.

FIG. 2 is a diagram illustrating an example network architecture 200, in accordance with one or more embodiments of the disclosure. The network architecture 200 includes network 205, network devices 210, networks 211, computing devices 212, device management system 220, management application 230, and external devices 230. The network architecture 200 may also optionally include computing resources 280 and storage resources 290. The network architecture 200 may allow for more secure and safe access to the network devices 210, the networks 211, and/or the computing devices 212, as discussed in more detail below.

In one embodiment, the network devices 210 may be devices that allow a computing device 212 to communicate data (e.g., transmit and/or receive messages, packet, or other data) with other computing devices and/or external devices 240. For example, a network device 210 may route, forward, of switch data between different computing devices 212, networks 211, and/or external devices 240. A network device 210 may also be referred to as a router, switch, bridge, etc. The network devices 210 may allow the computing devices 212 to communicate data based on one or more rules, as discussed in more detail below.

A network device 210 may allow a computing device to access network 205, though which the external devices 240 may be accessed. The network 205 may be a public network (e.g., the internet), a private network (e.g., a local area network (LAN) or wide area network (WAN)), or a combination thereof. In one embodiment, network may include a wired or a wireless infrastructure, which may be provided by one or more wireless communications systems, such as a wireless fidelity (Wi-Fi) hotspot connected with the network, a cellular system, and/or a wireless carrier system that can be implemented using various data processing equipment, communication towers (e.g. cell towers), etc.

In one embodiment, a computing device 212 may be any device, machine, or apparatus that is capable of executing a set of instructions (sequential or otherwise) that specify actions to be taken by that machine. A computing device may include hardware such as processing devices (e.g., processors, central processing units (CPUs), memory (e.g., random access memory (RAM), storage devices (e.g., hard-disk drive (HDD), solid-state drive (SSD), etc.), and/or other hardware devices (e.g., sound card, video card, etc.). Examples of a computing device may include, but are not limited to, a personal computer (PC), a server computer, a smart phone, a cellular phone, a laptop computer, a desktop computer, a tablet computer, a smart home device (e.g., a security camera, a smart thermostat), a smart watch, a media streaming/player device, a gaming console, an Internet-of-things (IOT) device, etc. Further, while only the disclosure may refer to a single computing device, the term "computing device" shall also be taken to include any collection of computing devices that individually or jointly execute a set (or multiple sets) of instructions to perform the methods discussed herein.

In one embodiment, the networks 211 may be networks that are created by the network device 210 to isolate the computing device 212 from each other. For example, each computing device 212 that is connected to a network device 210 may be placed in its own network 212 and data may not be communicated between networks 211 by default. The networks 211 may be referred to as virtual networks, mini-networks, etc.

The management application 230 may be a service, application, computing device, etc., that allows a user to access the device management system 220. For example, the management application may be an application on a user's smartphone or laptop computer (e.g., a system administrator's smartphone) that allows the user to access and/or modify different components of the device management system 220 e.g., the device inventory 221, the device library 223, etc.). The management application 230 may also allow the user to administer and/or manage the various network devices 210, computing devices 212, and/or rules that allow the different computing devices 212 different permissions.

In one embodiment, the device management system 220 may be used to track and/or manage the different computing devices 212 that are connected to the different network device 210. The device management system may also categorize different computing devices 212 and may transmit different rules (which grant different permissions for the computing devices 212) based on the categories of the computing devices, as discussed in more detail below.

In one embodiment, device management system 220 may include one or more virtual machines (VMs). A VM may be a software implementation of a machine (e.g., a software implementation of a computing device) that includes its own operating system (referred to as a guest OS) and executes application programs, applications, software. A VM may execute on a hypervisor which executes on top of the OS for a computing device (referred to as a host OS). The hypervisor may also be referred to as a virtual machine monitor (VMM). The hypervisor may manage system resources, including access to hardware devices such as physical processing devices (e.g., processors, CPUs, etc.), physical memory (e.g., RAM), storage device (e.g., HDDs, SSDs), and/or other devices (e.g., sound cards, video cards, etc.). The hypervisor may also emulate the hardware (or other physical resources) which may be used by the VMs to execute software/applications.

In one embodiment, the device management system 220 may include one or more containers. A container may be an isolated set of resources allocated to executing an application, software, and/or process independent from other applications, software, and/or processes. A container may execute on a container engine which executes on top of the OS for a computing device. The host OS (e.g., an OS of the computing device) may use namespaces to isolate the resources of the containers from each other. The container may share the kernel, libraries, and binaries of the host OS with other containers that are executing on the computing device. The container engine may allow different containers to share the host OS (e.g., the OS kernel, binaries, libraries, etc.) of a computing device. The container engine may also facilitate interactions between the container and the resources of the computing device.

In one embodiment, the device management system 220 may use the computing resources 280 to perform various functions, tasks, operations, etc., such as categorizing computing devices, determining rules, etc. The computing resources 280 may include computing devices which may include hardware such as processing devices (e.g., processors, central processing units (CPUs), processing cores), memory (e.g., random access memory (RAM), storage devices (e.g., hard-disk drive (HDD), solid-state drive (SSD), etc.), and other hardware devices (e.g., sound card, video card, etc.). The computing devices may comprise any suitable type of computing device or machine that has a programmable processor including, for example, server computers, desktop computers, rackmount servers, etc. In some examples, the computing devices may include a single machine or may include multiple interconnected machines (e.g., multiple servers configured in a cluster, cloud computing resources, etc.).

The computing resources 280 may also include virtual environments. In one embodiment, a virtual environment may be a virtual machine (VM) that may execute on a hypervisor which executes on top of the OS for a computing device. In another embodiment, a virtual environment may be a container that may execute on a container engine which executes on top of the OS for a computing device. In one embodiment, the device management system 220 may manage the allocation and/or use of computing resources 280 (e.g., computing clusters, server computers, VMs, containers, etc.).

In one embodiment, the device management system 220 may use the storage resources 290 to store data, such as libraries, machine learning models, inventories, etc. The storage resources 290 may include various different types of storage devices, such as hard disk drives (HDDs), solid state drives (SSD), hybrid drives, storage area networks, storage arrays, computing devices, etc. The storage resources 290 may also include cloud storage resources or platforms which allow for dynamic scaling of storage space. In one embodiment, the device management system 220 may also manage the allocation and/or use of storage resources 290.

Although the computing resources 280 and the storage resources 290 are illustrated separate from the device management system 220, one or more of the computing resources 280 and the storage resources 290 may be part of the device management system 220 in other embodiments. For example, the device management system 220 may include one or more of the computing resources 280 and the storage resources 290.

In one embodiment, a network device 210 may receive a request from a computing device 212 to connect to the network device 210. For example, the computing device 212 (e.g., a smartphone, a smart speaker, a laptop computer, etc.) may request to connect with the network device 210 to gain access to the network 205 (e.g., the internet) and/or external devices 240 (e.g., a server computer, a website, a database, a service, etc.). For example, the computing device 212 may use the network device 210 to forward data between the networks 211 (which are created, instantiated, etc., by the network device 210) and/or to other computing devices 212 (that are connected to the network device 210).

In one embodiment, the network device 210 may create a network 211 (e.g., a virtual network) for a computing device 212. For example, the network device 210 may instantiate, create, allocate, etc., the network 211 for the computing device 212. As illustrated in FIG. 2, the network device 200 can create, instantiate, allocate, etc., a set of networks 211 (e.g., one or more networks 211). In addition, a set of computing devices 212 (e.g., one or more computing devices 212) are connected to the network device.

In one embodiment, each computing device 212 and/or each network 211 is isolated from the other networks 211 and/or computing device 212, when the computing device 212 connects to the network device 210 and/or the respective network 211 is created. For example, initially, no computing device 212 that is connected to a network device 210 is able to communicate data with other computing devices 212 that are connected to the network device 210. In another example, the network device 210 may not allow data to be communicated between the networks 211 when the networks 211 are initially created.

In one embodiment, the network device 210 may assign the computing device 212 to the network 211 (e.g., a virtual network). For example, the network device 210 may associate a computing device 212 with a respective network 211. The network device 210 may determine/generate a device identifier for the computing device 212 and may determine/generate a network identifier for the respective network 211. The network device 210 may associate the network identifier with the device identifier. In one embodiment, each network 211 may include only a single computing device 212. For example, multiple computing devices 212 cannot share a network 211.

In one embodiment, the network device 210 may send, transmit, etc., a registration message to the device management system 220. The registration message may indicate that a computing device 212 has connected to the network device 201. For example, the network device 210 may transmit one or more of the device identifier for the computing device 212 and the network identifier of a respective network 211, in the registration message. This may allow the device management system 220 to track which computing devices 212 are connected to which network devices 210, and to track which networks 211 have been created (e.g., allocated, instantiated, etc.) for which computing devices 212.

The registration message may also include other information and/or data. In one embodiment, the registration message may also include device information for a computing device 212. Device information may be data and/or other information that may be used to identify a category and/or type of the computing device 212. For example, the device information may be an international mobility equipment identify (IMEI) number, a medium access control (MAC) address, or some other identifier for the computing device 212. The device information may also include metadata that may have been received (by the network device 210) from the computing device 212. For example, the device information may include the types of messages transmitted by the computing device 212, the security protocols used by the computing device 212, the network protocols used by the computing device 212, etc. In other embodiments, the device information may be transmitted to the device management system 220 in a separate message. For example, a second message, in addition the registration message, may be sent and the second message may include the device information.

In one embodiment, the network device 210 may receive a response message from the device management system 220. The response message may indicate whether the computing device 212 is allowed to connect to a network device 210. For example, the network device 210 may be part of a corporate network/system and the computing device 212 may be a device that is not part of the corporate network/system (e.g., is not a device that does not belong to an employee of the corporation). In a further example, the network device 210 may be part of a residential (e.g., home) network/system and the computing device 212 may belong to a family member.

In one embodiment, the response message may indicate that computing device 212 is allowed to communicate or connect with the network device 210. If the computing device 212 is allowed, the network device 210 may allow the computing device 212 to remain connected to the network device 210 and may maintain the respective network 211 for the computing device 212.

In one embodiment, the response message may indicate that the computing device 212 is not allowed to communicate or connect with the network device 210. If the computing device 212 is not allowed, the network device 212 may remove (e.g., delete, deallocate, etc.) the respective network 211 and may disconnect the computing device 212 from the network device 210. For example, the network device 212 may delete the respective network 211 and may drop the data (e.g., message, packets, etc.) transmitted by the computing device 212.

In one embodiment, the network device 210 may transmit a deregistration message to the device management system 220 when a computing device 212 disconnects from the network device 210. For example, the computing device 212 may transmit one or more messages to the network device 210 indicating that the computing device 212 is disconnecting from the network device 210. In another example, communications between the network device 210 and the computing device 212 may time out (e.g., no data/packets may be received from the computing device 212 within a threshold period of time). The network device 210 may transmit the deregistration message to allow the device management system 220 to track that the computing device 212 has disconnected from the network device 210.

In one embodiment, the network device 210 may receive a set of rules. The set of rules of may be associated with a computing device 212. For example, the set of rules may indicate permissions for the computing device 212. The network device 210 may communicate network traffic (e.g., messages, packets, frames, data, etc.) between computing devices 212 and/or between a computing device 212 and/or an external device 240, based on the set of rules for the computing device 212. For example, the network device 210 may forward a message or packet from a computing device 212 to an external device 240 if there is a rule that allows the computing device 212 to communicate with the external device 240.

In one embodiment, the network device 210 may receive an updated set of rules for a computing device 212. For example, the device management system 220 may grant additional permissions to the computing device 212 and/or may remove some permissions for the computing device 212. The data management system 220 may transmit an updated set of rules that indicated the updated permissions, to the network device 210. The network device may receive the updated set of permissions and may communicate data between the computing devices 212 and/or between the computing devices and the external devices 240, based on the updated set of rules.

In one embodiment, all of the computing devices 212 may initially be isolated from each other (e.g., may not be able to communicate data between each other) unless a rule allows the computing devices 212 to communicate with each other. In addition, all of the computing devices 212 may initially not able to access external devices 240 (e.g., may not be able to transmit and/or receive data with external device 240) unless a rule allows a computing device 212 to communicate data with an external device 240. This may increase the security and/or safety of the network architecture 200, the network devices 210, and/or the computing devices 212. For example, by isolating the computing devices 212 from each other and from the external devices 240, the network architecture is able to prevent and/or mitigate unauthorized access. For example, if a computing device 212 is infected with a virus, malware, or some other malicious software, the computing device 212 may not be able to transmit personal information of the user to an external device 240 (e.g., to a server that is operated by a hacker) because by default (e.g., initially), access to external devices 240 are restricted.

In one embodiment, the device management system 220 may receive a registration request from a network device 210. The registration request may indicate that a computing device 212 has connected to the network device 210, as discussed above. The registration request may also include device information or the device information may be transmitted via a second message from the network device 210, as discussed above.

In one embodiment, the device management system 220 may determine whether the computing device 212 should be allowed to connect to the network device 210. For example, the device management system 220 may analyze one or more records and/or the device inventory 221 to determine whether the computing device 212 is allowed to connect to the network device 210. The device management system 220 may transmit a response message to the network device based on the registration message. The response message may indicate whether the computing device 212 is allowed to access the network device 210, as discussed above.

In one embodiment, the device management system 220 may maintain a record, log, table, etc., of the different computing devices 212 that are connected to the different network device 210. For example, the device management system 220 may include a device inventory 221 that may record which computing devices 212 are assigned to which networks 211 (e.g., which virtual networks) of the different network device 210. The device management system 220 may update the device inventory 221 each time a computing device 212 connects to a network device 210 and/or each time a computing device 212 is disconnected from a network device 210. For example, each time a computing device 212 connects to a network device 210, a new entry may be created in the device inventory 221. Each time a computing device 212 disconnects from a network device 210, the entry for the computing device 212 may be removed, deleted, etc. This allows the device management system 220 to track all of the different computing devices 212 that are part of the network architecture 200.

In one embodiment, the device management system 220 may receive a deregistration message from the network device 210. The deregistration message may indicate that a network device 210 has disconnected from a network device 210, as discussed above. The device management system 220 may update the device inventor 221 based on the deregistration message, as discussed above.

In one embodiment, the device management system 220 may determine one or more categories for a computing device 212 based on the device information that is received from a network device (e.g., received in a registration message or via another message). For example, the device management system 220 may analyze the device information to determine the category of a computing device. In some embodiments, the category may indicate a type, manufacturer/make, model, and/or function of a computing device 212. For example, a computing device 212 may be in a smart phone category, or a smart watch category. In other embodiments, there may be different levels of categories (e.g., a hierarchy of categories) and a computing device 212 may belong to multiple categories. For example, a first level category of a computing device 212 may be "computer" and a second level category of the computing device 212 may be "laptop computer." In another example, a first level category of a computing device 212 may be "IOT device," the second level category of the computing device may be "smart home," and the third level category of the computing device 212 may be "smart thermostat." The categories described herein are merely examples. Different taxonomies, hierarchies, etc., for categorizing computing devices 212 may be used in other embodiments.

In one embodiment, the device management system may use different types of machine learning and/or artificial intelligence systems, algorithms, etc., to determine one or more categories for a computing device 212. For example, the device information (e.g., that was received from the network device 210) may be provided to a machine learning model 221 (e.g., a neural network) and the machine learning model may generate/determine one or more categories for the computing device 212. In other embodiments, support vector machines, supervised learning, semi-supervised learning, unsupervised learning, regression analysis, boosting, Bayesian networks, etc., may be used to determine one or more categories for the computing device.

In one embodiment, the device management system 220 may use a device library 223 to determine one or more categories for a computing device 212. The device library may be a record of different categories and/or types of computing devices 212 that have been determined by the device management system 220. For example, previous device information may have been analyzed and/or recorded when categorizing previous computing devices 212. The relevant portions of the device information that was used to categorize a previous computing device 212 (e.g., packet header values, metadata transmitted by the previous computing device 212, etc.) may be stored as part of the device library 223, along with the category for the previous computing device 212. This may allow the device management system 220 to lookup a category for a computing device 212 based on the device information and the device library 223.

In another embodiment, the device management system 220 may use a device fingerprint to determine one or more categories for the computing device 212. For example, based on dynamic host configuration protocol (DHCP) messages communicated by the computing device 212, the device management system 220 may perform DHCP fingerprinting (e.g., may determine, generate, etc., a DHCP fingerprint) on the computing device 212. Other types of fingerprinting (e.g., other types of device fingerprints) may be used in other embodiments.

In one embodiment, the device management system 220 may also determine, generate, etc., a set of rules for a computing device 212 based on one or more categories for the computing device. For example, if the computing device 212 is an IOT device, the device management system 220 may identify a set of rules that may be used for IOT devices. In another example, if the IOT device is a particular type of IOT device, such as a security camera, the device management system may identify another set of rules that may be used for security cameras.

In one embodiment, the device management system 220 may use a rules library 224 to determine, generate, etc., the set of rules for a computing device 212. The rules library 224 may be a repository, database, record, etc., of rules that may be applied to different categories of computing devices 212. For example, the rules library 224 may be a table where each entry includes a category and a rule associated with that category. The device management system 220 may select one or more rules from the rules library 224 based on the one or more categories determined for a computing device 212. The rules library 224 may also indicate whether a rule is associated with a particular computing device 212.

As discussed above, the set of rules indicate permissions for a computing device 212. For example, the set of rules may indicate the amount of data a computing device 212 may transmit/receive, the type of data a computing device 212 may transmit/receive, the network protocols a computing device 212 may use, whether a computing device 212 is allowed to receive and/or transmit data to a particular device, etc.

As discussed above, some of the rules (e.g., a subset of rules) may be determined (e.g., selected, identified, etc.) based on for one or more categories of the computing device 212. For example, out a set of rules determined for a computing device 212, half of the rules may be selected based on the category of the computing device 212. In one embodiment, some of the rules may be determined for a specific computing device 212. For example, a computing device 212 may have an IMEI number, a MAC address, or some other identifier (e.g., a unique identifier). The device management system 220 may be able to determine that for a given network device 210, a specific computing device 212 should be granted/allowed certain permissions. The set of rules may include the rules that are selected based on the computing device 212 (e.g., based on a specific computing device 212).

As discussed above, the device management system 220 may transmit sets of rules to the network devices 210 to grant/allow different computing devices 212 different permissions. In one embodiment, the device management system 220 may receive updates to one or more rules. For example, a user (e.g., a network administrator) may determine that a category of computing device and/or a specific computing device 212 should be granted additional permissions. The user may update the rules library 225 via the management application 230 (e.g., via a graphical user interface (GUI), command line interface (CLI), etc., of the management application 230) to add the additional permissions. When the device management system 220 determines that changes have been made to the rules library 224, the device management system 220 may identify computing devices 212 that may have been affected by the updated rules. For example, if a rule for a category has been updated, all computing devices 212 that are of that category may be affected. The device management system 220 may transmit the updated set of rules to the network devices 210 that are connected to the computing devices that are affected. For example, the device management system 220 may access the device inventory 221 to identify the computing devices 212 that are affected and may transmit the updated rules to the network devices 210 that are connected to the affected computing device 212.

In one embodiment, the device management system 220 may determine that a computing device 212 has a category that has not been previously encountered. For example, the device management system 220 may determine that the category of a computing device 212 is unknown (e.g., based on the output of a machine learning model 22 or the device library 223) or has a new category. The device management system 220 may transmit a message to a user (e.g., a network administrator) indicating that a computing device 212 with a new or unknown category was seen. The user may provide input (via the management application 230) to provide a name (e.g., an identifier) for the category and the new category may be added to the device library 223. The user may also provide one or more rules for the new category. These new rules may be added to the rules library.

Figure 3:
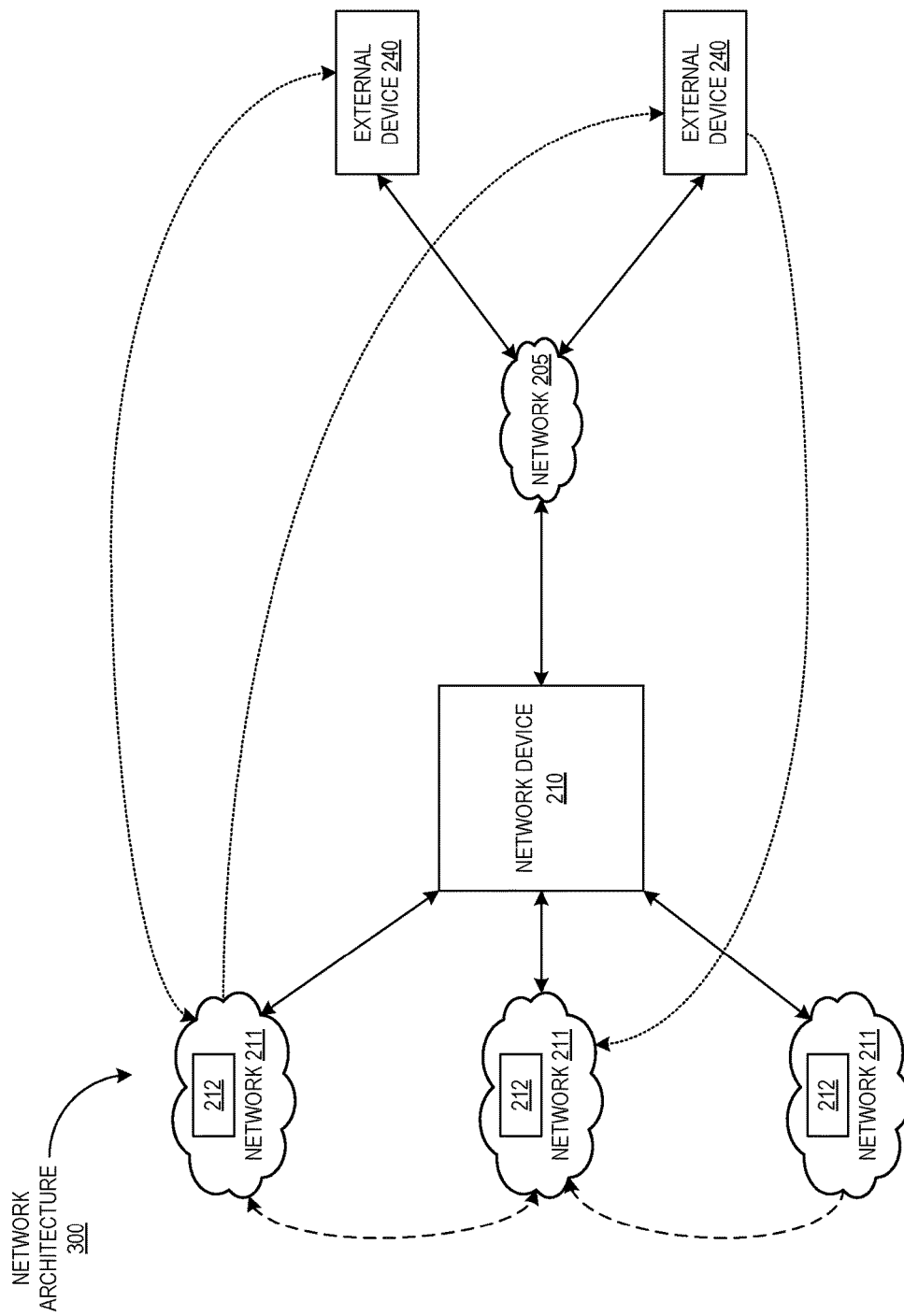
FIG. 3 is a block diagram illustrating an example network architecture in accordance with one or more embodiments of the disclosure.

FIG. 3 is a diagram illustrating an example network architecture 300, in accordance with one or more embodiments of the present disclosure. The network architecture 300 includes networks 211 (e.g., virtual networks), computing devices 212, network device 210, network 205, and external devices 240. The network architecture 300 may be a simplified version of network architecture 200 (shown in FIG. 2) and may illustrate how example rules may allow the computing devices 212 to communicate data with each other and/or with external devices 240.

As discussed above, a device management system (e.g., device management system 220 illustrated in FIG. 2) may categorize the computing devices 212 and may send sets of rules for the different computing devices 212 to the network devices 210. The sets of rules may indicate permissions for the computing devices 212. The network device 210 may communicate network traffic (e.g., messages, packets, frames, data, etc.) between computing devices 212 and/or between a computing device 212 and/or an external device 240, based on the set of rules for the computing device 212.

As illustrated in FIG. 3, the rules allow the top computing device 212 to transmit data to the middle computing device 212 and to receive data from the middle computing device 212, as indicated by the bi-directional dashed arrow. In addition, the rules allow the middle computing device 212 to receive data from the bottom computing device 212, as indicated by the unidirectional dotted arrow.

Also as illustrated in FIG. 3, the rules allow the top computing device 212 to transmit data to and receive data from the top external device 240 (e.g., a server, a website, etc.). The rules also allow the top computing device 212 to transmit data to the bottom external device 240. In addition, the rules allow the middle computing device 212 to receive data from the bottom external device 240.

Figure 4:
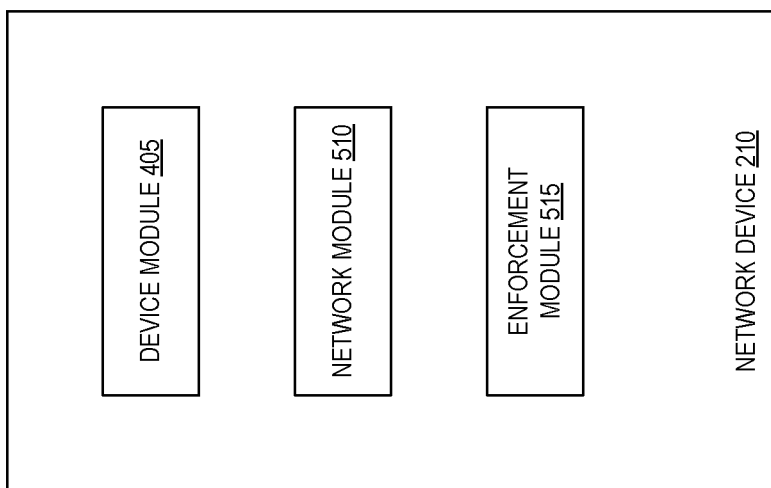
FIG. 4 is a diagram illustrating an example network device in accordance with one or more embodiments of the disclosure.

FIG. 4 is a diagram illustrating an example network device 210, in accordance with one or more embodiments of the present disclosure. The device management system 220 includes a device module 405, a network module 410, and an enforcement module 415. The device module 405, the network module 410, and the enforcement module 415 may be interconnected via one or more or more networks (e.g., wired networks, wireless networks, etc.). The modules 405 through 415 may be implemented in software, hardware, firmware, or a combination thereof. For example, one or more of the modules 405 through 415 may be installed in persistent storage device, loaded into memory, and executed by one or more processors (not shown). In another example, one or more of the modules 405 through 415 may be processing devices, such as an application specific integrated circuit (ASIC), a field programmable gate array (FPGA), VMs, containers, etc. Some of modules 405 through 415 may be integrated together as an integrated component. In addition, some of the modules 405 through 415 may be located in different computing devices (e.g., different server computers).

In one embodiment, the device module 405 may determine when a computing device connects to the network device 210 and may transmit registration messages and/or deregistration messages to a device management system. The device module 405 may transmit receive messages indicating wither a computing device is allowed to connect to a network device. The device module 405 may also transmit device information, which may be used by the device management system to determine one or more categories for the device.

In one embodiment, the network module 410 may create a network (e.g., a virtual network) for a computing device and may assign the computing device to the network. As discussed above, the network may be initially isolated from other networks created by the network device (e.g., may be isolated by default).

In one embodiment, the enforcement module 515 may receive one or more rules for a computing device, from the device management system. The enforcement module 515 may allow the computing device to communicate data with other computing devices and/or external devices, based on the rules. For example, the enforcement module 515 may allow certain types of network traffic (e.g., messages, packet, frames, or other data) to be communicated to certain computing devices and/or external devices.

Figure 5:
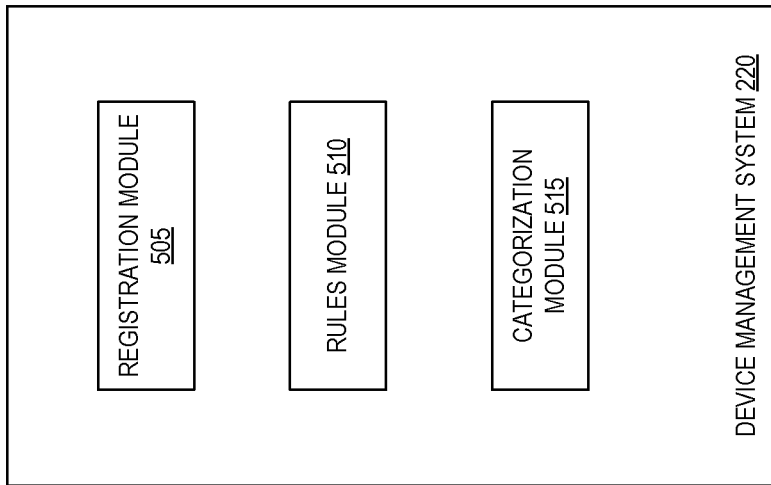
FIG. 5 is a diagram illustrating an example device management system, in accordance with one or more embodiments of the present disclosure.

FIG. 5 is a diagram illustrating an example device management system 220, in accordance with one or more embodiments of the present disclosure. The device management system 220 includes a device module 505, a rules module 510, and a categorization module 515. The device module 505, the rules module 510, and the categorization module 515 may be interconnected via one or more or more networks (e.g., wired networks, wireless networks, etc.). The modules 505 through 515 may be implemented in software, hardware, firmware, or a combination thereof. For example, one or more of the modules 505 through 515 may be installed in persistent storage device, loaded into memory, and executed by one or more processors (not shown). In another example, one or more of the modules 505 through 515 may be processing devices, such as an application specific integrated circuit (ASIC), a field programmable gate array (FPGA), VMs, containers, etc. Some of modules 505 through 515 may be integrated together as an integrated component. In addition, some of the modules 505 through 515 may be located in different computing devices (e.g., different server computers).

In one embodiment, the registration module 505 may receive registration messages and/or deregistration messages from a network device. The registration module 505 may transmit response messages indicating wither a computing device is allowed to connect to a network device. In addition, the registration module 505 may also update a device inventory to track and/or manage which computing devices are coupled to which network devices.

In one embodiment, the categorization module 515 may determine one or more categories for a computing device. For example, the categorization module 515 may use one or more of device information received from a computing device, a machine learning model, a device library, etc., to determine (e.g., identify, select, etc.) one or more categories for a computing device.

In one embodiment, the rules module 510 may generate one or more rules for a computing device based on the one or more categories for the computing device. For example, the rules module 510 may determine (e.g., identify, select, etc.), one or more rules for the computing device based on the categories of the computing device and a rules library.

Figure 6:
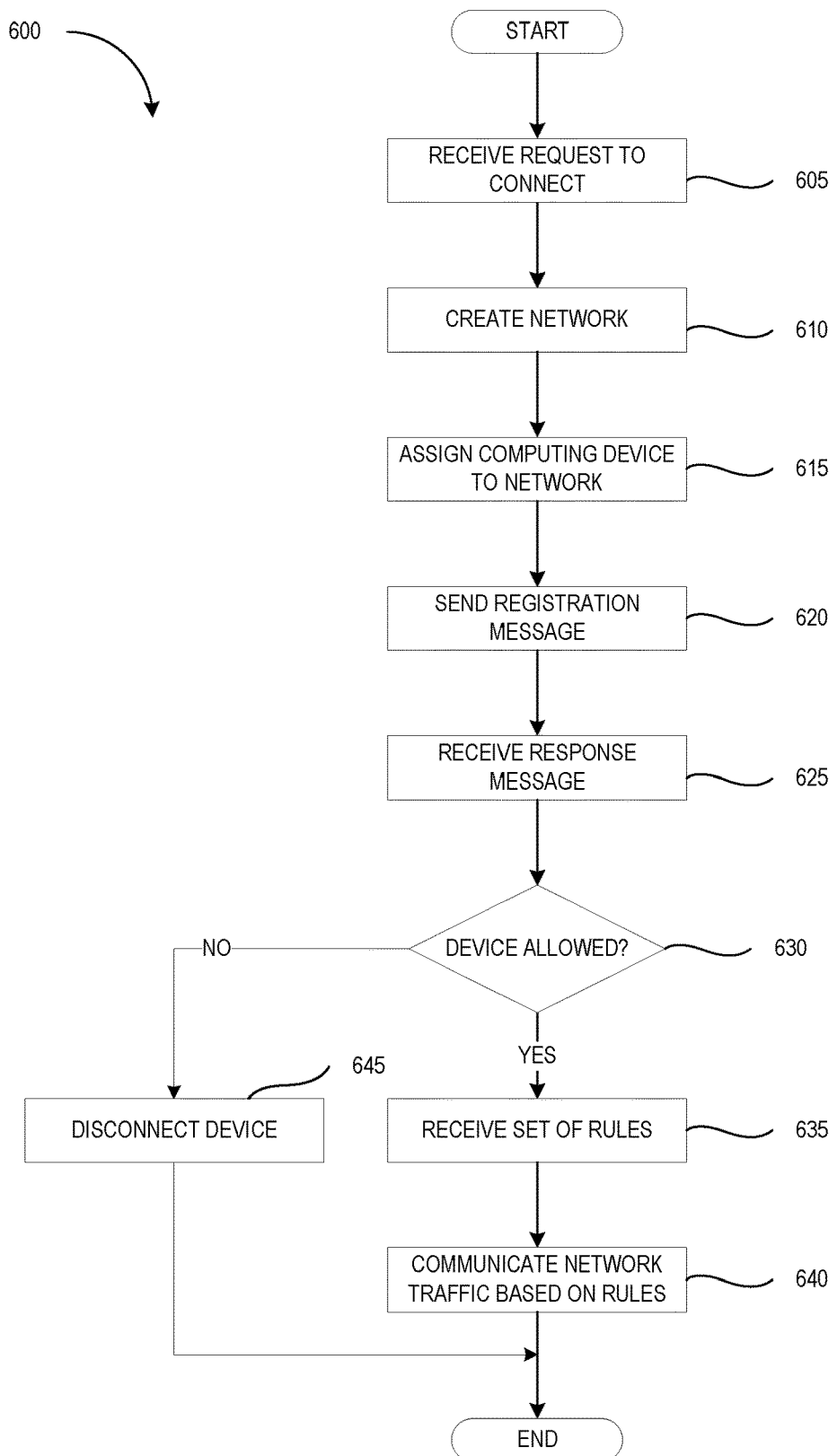
FIG. 6 is a flow diagram of a process of securing computer networks in accordance with one or more embodiments of the disclosure.

FIG. 6 is a flow diagram of a process 600 of securing computer networks in accordance with one or more embodiments of the present disclosure. Process 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the process 600 may be performed by a network device.

With reference to FIG. 6, process 600 illustrates example functions used by various embodiments. Although specific function blocks ("blocks") are disclosed in process 600, such blocks are examples. That is, embodiments are well suited to performing various other blocks or variations of the blocks recited in process 600. It is appreciated that the blocks in process 600 may be performed in an order different than presented, and that not all of the blocks in process 600 may be performed. In addition, additional other blocks (not illustrated in FIG. 6) may be inserted between the blocks illustrated in FIG. 6.

The process 600 begins at block 605, where the process 600 may receive a request to connect to a network device from a computing device. At block 610, the process may create a network (e.g., a virtual network) for the computing device. As discussed above, the network may initially be isolated from other networks of the network device. At block 615, the process 600 may assign the computing device to the network. At block 620, the process may transmit a registration message to a device management system. The registration message may indicate that the computing device has connected to the network device. The registration message may also optionally include device information.

At block 625, the process 600 may receive a response message from the device management system. As discussed above, the response messages may indicate whether the computing device is allowed to connect to the network device. At block 630, the process 600 may determine whether the computing device is allowed to connect to the network device based on the response message. If the computing device is not allowed to connect to the network device, the process 600 may disconnect the computing device and remove the network for the computing device at block 645. If the computing device is allowed to connect to the network device, the process 600 may receive a set of rules from the device management system at block 635. As discussed above, the rules may indicate one or more permissions for the computing device. For example, the rules may indicate which computing devices and/or external devices a computing device is allowed to communicate with. At block 640, the process 600 may communicate network data (e.g., transmit and/or receive messages, packets, etc.) based on the rules. For example, the process 600 may forward messages to an external device or to another computing device based on the rules.

Figure 7:
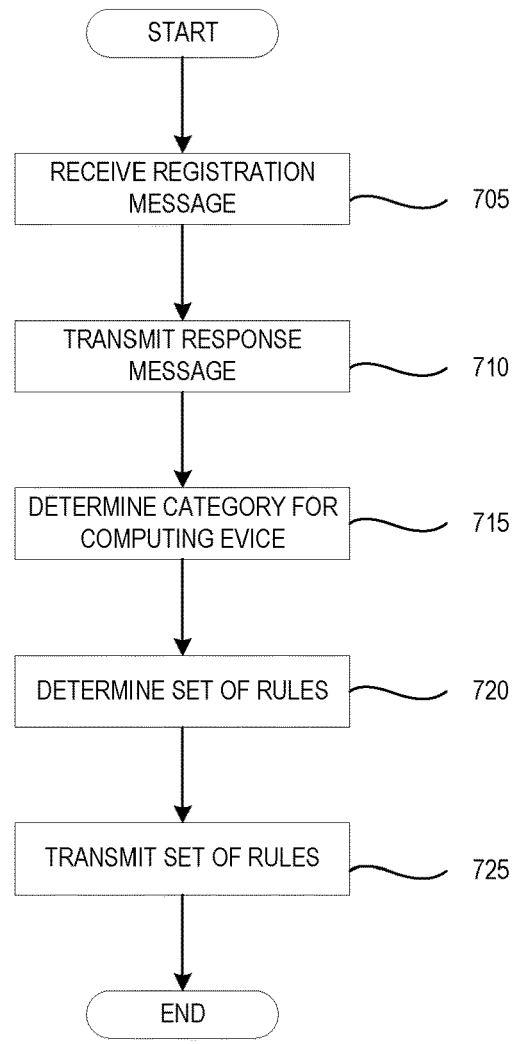
FIG. 7 is a flow diagram of a process of securing computer networks in accordance with one or more embodiments of the disclosure.

FIG. 7 is a flow diagram of a process 700 of securing computer networks in accordance with one or more embodiments of the present disclosure. Process 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the process 700 may be performed by a device management system.

With reference to FIG. 7, process 700 illustrates example functions used by various embodiments. Although specific function blocks ("blocks") are disclosed in process 700, such blocks are examples. That is, embodiments are well suited to performing various other blocks or variations of the blocks recited in process 700. It is appreciated that the blocks in process 700 may be performed in an order different than presented, and that not all of the blocks in process 700 may be performed. In addition, additional other blocks (not illustrated in FIG. 7) may be inserted between the blocks illustrated in FIG. 7.

The process 700 begins at block 705, where the process 700 may receive a registration message from a network device. The registration message may indicate that a computing devices is connecting to the network device. At block 710, the process 700 may transmit a response message to the network device. As discussed above, the response message may indicate whether the computing device is allowed to connect to the network device. At block 715, the process 700 may determine a category for the computing device. For example, the process 700 may use a machine learning model and/or a device library to determine one or more categories for the computing device. At block 720, the process 700 may determine a set of rules for the computing device based on the one or more categories. As discussed above, the rules may indicate one or more permissions for the computing device. For example, the rules may indicate which computing devices and/or external devices a computing device is allowed to communicate with. At block 725, the process may transmit the set of rules to the computing device.

Figure 8:
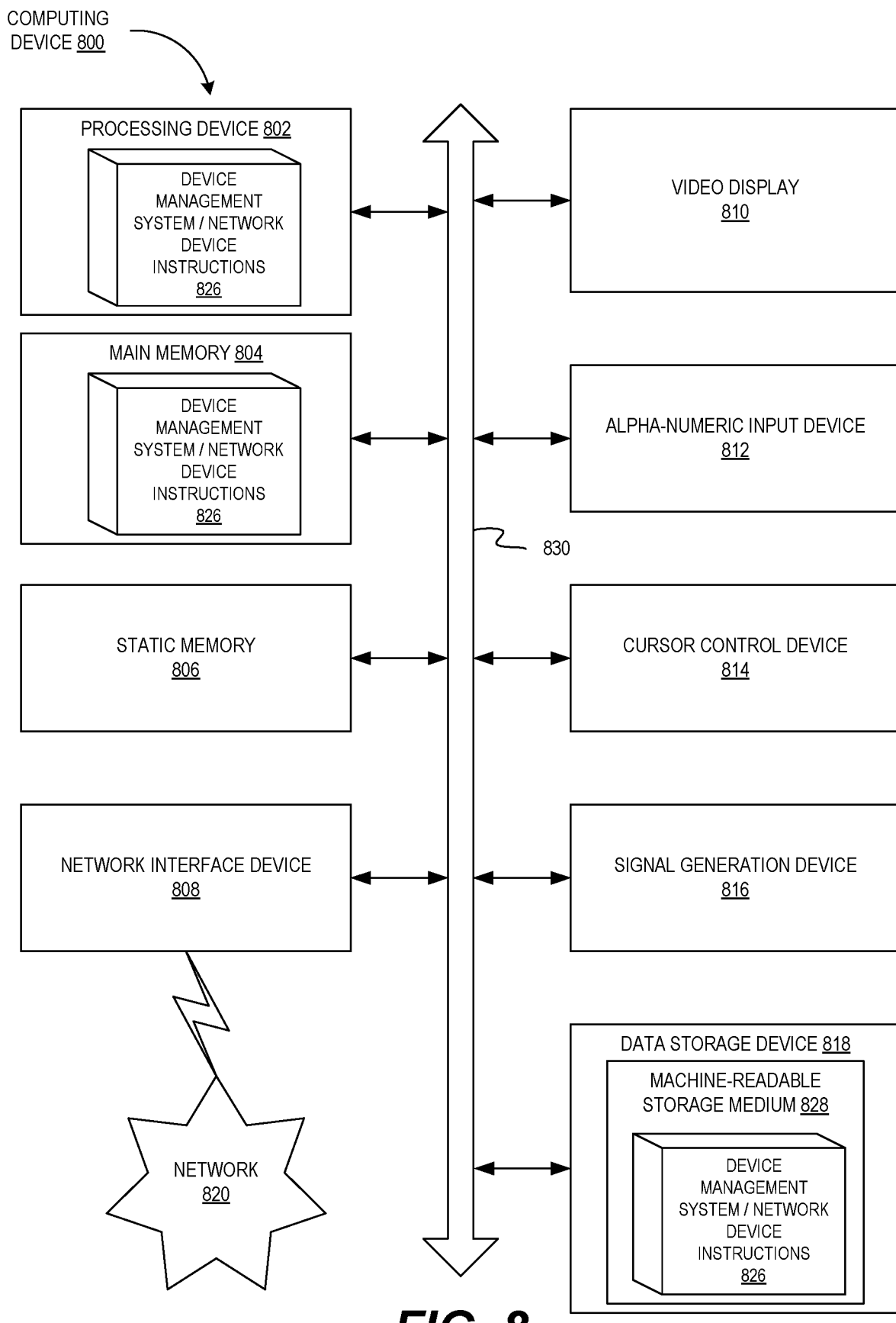
FIG. 8 is a block diagram of an example computing device in accordance with one or more embodiments of the disclosure.

FIG. 8 is a block diagram of an example computing device 800 that may perform one or more of the operations described herein, in accordance with some embodiments. Computing device 800 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein. In some embodiments, the computing device 800 may be one or more of an access point and a packet forwarding component.

The example computing device 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may also comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

Computing device 800 may further include a network interface device 808 which may communicate with a network 820. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse) and an acoustic signal generation device 816 (e.g., a speaker). In one embodiment, video display unit 810, alphanumeric input device 812, and cursor control device 814 may be combined into a single component or device (e.g., an LCD touch screen).

Data storage device 818 may include a computer-readable storage medium 828 on which may be stored one or more sets of instructions, e.g., instructions for carrying out the operations described herein, in accordance with one or more aspects of the present disclosure. Instructions 826 implementing one or more components/modules of a network device and/or a device management system, may also reside, completely or at least partially, within main memory 804 and/or within processing device 802 during execution thereof by computing device 800, main memory 804 and processing device 802 also constituting computer-readable media. The instructions may further be transmitted or received over a network 820 via network interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "creating," "assigning," "sending," "removing," "receiving," "communicating," "transmitting," "determining," "updating," "requesting," "adding," "removing," "generating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   receiving a registration message from a network device, wherein the registration request indicates that a first computing device has connected to the computing devices;
   determining a category for the first computing device based on the registration message and based on a machine learning model, wherein the category comprises a new category that was not been previously encountered;
   determining a set of rules for the computing device based on the category and updating a library of rules to include the set of rules, wherein the set of rules are for the new category; and
   transmitting the set of rules for the first computing device, wherein:
      the set of rules indicates permissions for the first computing device;
      the first computing device is one of a set of computing devices that are connected to the network device;
      the first network is one of a set of networks of the networking device;
      each network of the set of networks is initially isolated from other networks of the set of networks when the network is created; and
      each network of the set of networks comprises a respective computing device of the set of computing devices.

2. The method of claim 1, wherein each network of the set of networks comprises only a single computing device.

3. The method of claim 1, further comprising:
   determining whether the first computing device is allowed to connect to the network device; and
   transmitting a response message to the network device based on the registration message, wherein the registration message indicates whether the first computing device is allowed to connect to the network device.

4. The method of claim 1, wherein the registration message further comprises device information.

5. The method of claim 1, further comprising:
   updating a device inventory to indicate that the first computing device is connected to the network device, wherein the device inventory indicates which computing devices are connected to which network devices.

6. The method of claim 5, further comprising:
   receiving a deregistration message from the network device, wherein the deregistration message indicates that the first computing devices is not connected to the network device; and
   updating the device inventory to indicate that the first computing device is not connected to the network device.

7. An apparatus, comprising:
   a memory to store data; and
   a processing device, coupled to the memory, the processing device to:
      receive a registration message from a network device, wherein the registration request indicates that a first computing device has connected to the computing devices; and
      determine a category for the first computing device based on the registration message and based on a machine learning model, wherein the category comprises a new category that was not been previously encountered;
      determine a set of rules for the computing device based on the category and updating a library of rules to include the set of rules, wherein the set of rules are for the new category;
      transmit a set of rules for the first computing device, wherein:
         the set of rules indicates permissions for the first computing device;
         the first computing device is one of a set of computing devices that are connected to the network device;
         the first network is one of a set of networks of the networking device;
         each network of the set of networks is initially isolated from other networks of the set of networks when the network is created; and
         each network of the set of networks comprises a respective computing device of the set of computing devices.

8. The apparatus of claim 7, wherein each network of the set of networks comprises only a single computing device.

9. A non-transitory computer-readable medium having executable instructions to cause one or more processing devices to perform a method comprising: receiving a registration message from a network device, wherein the registration request indicates that a first computing device has connected to the computing devices; determining a category for the first computing device based on the registration message and based on a machine learning model, wherein the category comprises a new category that was not been previously encountered; determining a set of rules for the computing device based on the category and updating a library of rules to include the set of rules, wherein the set of rules are for the new category; and transmitting the set of rules for the first computing device, wherein: the set of rules indicates permissions for the first computing device; the first computing device is one of a set of computing devices that are connected to the network device; the first network is one of a set of networks of the networking device; each network of the set of networks is initially isolated from other networks of the set of networks when the network is created; and each network of the set of networks comprises a respective computing device of the set of computing devices.

10. The non-transitory computer-readable medium of claim 1, wherein each network of the set of networks comprises only a single computing device.

11. The non-transitory computer-readable medium of claim 1, the method further comprising: determining whether the first computing device is allowed to connect to the network device; and transmitting a response message to the network device based on the registration message, wherein the registration message indicates whether the first computing device is allowed to connect to the network device.

12. The non-transitory computer-readable medium of claim 1, wherein the registration message further comprises device information.

13. The non-transitory computer-readable medium of claim 1, further comprising: updating a device inventory to indicate that the first computing device is connected to the network device, wherein the device inventory indicates which computing devices are connected to which network devices.

14. The non-transitory computer-readable medium of claim 5, further comprising: receiving a deregistration message from the network device, wherein the deregistration message indicates that the first computing devices is not connected to the network device; and updating the device inventory to indicate that the first computing device is not connected to the network device.

* * * * *